(12) United States Patent
Wei et al.

(10) Patent No.: US 11,679,896 B2
(45) Date of Patent: Jun. 20, 2023

(54) APPARATUS AND METHOD FOR CONTINUOUS LAUNCHING OF UNMANNED AERIAL VEHICLES

(71) Applicant: NANJING UNIVERSITY OF AERONAUTICS AND ASTRONAUTICS, Nanjing (CN)

(72) Inventors: Xiaohui Wei, Nanjing (CN); Tianchi Gao, Nanjing (CN); Zhao Zhang, Nanjing (CN); Hong Nie, Nanjing (CN); Jingqi Huang, Nanjing (CN)

(73) Assignee: NANJING UNIVERSITY OF AERONAUTICS AND ASTRONAUTICS, Nanjing (CN)

( * ) Notice: Subject to any disclaimer, the term of this patent is extended or adjusted under 35 U.S.C. 154(b) by 433 days.

(21) Appl. No.: 16/960,326

(22) PCT Filed: Nov. 30, 2018

(86) PCT No.: PCT/CN2018/118786
§ 371 (c)(1),
(2) Date: Jul. 7, 2020

(87) PCT Pub. No.: WO2019/184418
PCT Pub. Date: Oct. 3, 2019

(65) Prior Publication Data
US 2020/0339280 A1 Oct. 29, 2020

(30) Foreign Application Priority Data
Oct. 22, 2018 (CN) ......................... 201811230033.X

(51) Int. Cl.
*B64F 1/06* (2006.01)
*B64U 70/70* (2023.01)
*B64C 39/02* (2023.01)

(52) U.S. Cl.
CPC .............. *B64F 1/06* (2013.01); *B64C 39/024* (2013.01); *B64U 70/70* (2023.01)

(58) Field of Classification Search
CPC .... B64F 1/106; B64C 2201/84; B64C 39/024
See application file for complete search history.

(56) References Cited

U.S. PATENT DOCUMENTS 9,994,335 B1 * 6/2018 Been .......................... B64F 1/06
10,370,120 B1 * 8/2019 McGann ................... B64F 1/06

FOREIGN PATENT DOCUMENTS

CN 108298103 A * 7/2018 ................ B64F 1/00
CN 108839812 A * 11/2018 ............. B64D 25/08
(Continued)

*Primary Examiner* — Philip J Bonzell
*Assistant Examiner* — Anna L. Gordon
(74) *Attorney, Agent, or Firm* — PROI Intellectual Property US; Klaus Michael Schmid

(57) ABSTRACT

An apparatus and method for continuous catapulting of unmanned aerial vehicles are disclosed, and relate to the technical field of aircraft catapulting and recovery. The apparatus consists of an unmanned aerial vehicle storage apparatus, an unmanned aerial vehicle conveying apparatus, an automatic unmanned aerial vehicle loading apparatus, tackles and a rotary tube-type multi-track unmanned aerial vehicle catapult. The present invention can increase catapulting efficiency of the unmanned aerial vehicles, and is suitable for rapidly forming a cluster of the unmanned aerial vehicles.

10 Claims, 6 Drawing Sheets

(56) References Cited

FOREIGN PATENT DOCUMENTS

| | | | | | |
|---|---|---|---|---|---|
| CN | 107640330 B | * | 1/2020 | | |
| RU | 2317227 C1 | * | 2/2008 | | |
| WO | WO-2014011296 A2 | * | 1/2014 | ................ | B64F 1/06 |

* cited by examiner

APPARATUS AND METHOD FOR CONTINUOUS LAUNCHING OF UNMANNED AERIAL VEHICLES

CROSS REFERENCE TO RELATED APPLICATIONS

The present application is the US national stage of International Patent Application PCT/CN2018/118786 filed on Nov. 30, 2018, which, in turn, claims priority to Chinese Patent Application CN 201811230033.X filed on Oct. 22, 2018.

TECHNICAL FIELD

The present invention relates to the technical field of aircraft catapulting and recovery, and more particularly relates to an apparatus and method for continuous catapulting of unmanned aerial vehicles.

BACKGROUND ART

Unmanned aerial vehicle cluster operation is a trend of future unmanned aerial vehicle applications, and the main content of the unmanned aerial vehicle cluster operation is to integrate various functional loads into an unmanned aerial vehicle cluster formation by using a reasonable method. When a single unmanned aerial vehicle platform is damaged, clusters can still execute tasks in an orderly manner. This flexibility can increase task execution efficiency and reduce development time and cost of unmanned aerial vehicle systems.

To achieve unmanned aerial vehicle clustering, it is necessary to ensure that unmanned aerial vehicles can be put into a combat environment in a timely and effective manner, that is, to realize continuous batch catapulting of a certain number of unmanned aerial vehicles. Traditional small and medium-sized unmanned aerial vehicle catapulting usually adopts elastic band catapulting, pneumatic-hydraulic catapulting and rocket-assisted catapulting. The rocket-assisted catapulting will generate a lot of light and heat, which is not conducive to concealment, and the pneumatic-hydraulic catapulting requires an external set of pneumatic-hydraulic power system, which reduces portability of a system to a certain extent. In addition, recharging time of an energy storage apparatus is too long, and it is difficult to achieve the continuous catapulting of the unmanned aerial vehicles.

SUMMARY OF THE INVENTION

Embodiments of the present invention provide an apparatus and method for continuous catapulting of unmanned aerial vehicles. For problems in a continuous batch catapulting technology of the unmanned aerial vehicles described in the related art, a continuous catapulting solution of the unmanned aerial vehicles is provided. A traditional elastic band catapult cooperates with one set of rotary tube mechanism and one set of automatic unmanned aerial vehicle storage and loading mechanism, thereby saving time for resetting catapult tackles and increasing catapulting efficiency of the unmanned aerial vehicles.

In order to achieve the foregoing objectives, the embodiments of the present invention adopt the following technical solutions:

The apparatus consists of an unmanned aerial vehicle storage apparatus (1), an unmanned aerial vehicle conveying apparatus (2), an automatic unmanned aerial vehicle loading apparatus (3), tackles (4) and a rotary tube-type multi-track unmanned aerial vehicle catapult (5).

The unmanned aerial vehicle storage apparatus (1) is configured to store unmanned aerial vehicles (6). The unmanned aerial vehicle conveying apparatus (2) is inserted into the unmanned aerial vehicle storage apparatus (1). The unmanned aerial vehicle conveying apparatus (2) is symmetrically arranged along a central axis of the unmanned aerial vehicle storage apparatus (1).

The automatic unmanned aerial vehicle loading apparatus (3) is configured to transfer the unmanned aerial vehicles (6) from the unmanned aerial vehicle conveying apparatus (2) to the tackles (4).

The rotary tube-type multi-track unmanned aerial vehicle catapult (5) is provided with at least three catapults (5.3). Each catapult (5.3) is butted with one tackle (4) and is configured to provide the tackle (4) with a driving force during catapulting.

The tackles (4) are mounted on catapult tracks. An upper portion of a tackle body includes carrier structures (4.2) and unmanned aerial vehicle locking mechanisms on carriers. A rear portion of the carrier includes a rear limiting mechanism (4.3), and the rear limiting mechanism consists of a limiting baffle plate (4.3.1) driven through a gear and a rack, a limiting slot (4.3.2) and a reset spring (4.3.3). A middle portion of the carrier includes a front limiting mechanism (4.4), and the front limiting mechanism consists of a limiting hook (4.4.1) connected with the carrier structure through a rotating shaft, a movable stop piece (4.4.2) for lifting the limiting hook, and a reset spring (4.4.3). The rotary tube-type multi-track unmanned aerial vehicle catapult (5) includes a rotating shaft mechanism (5.1) for controlling the catapult to rotate and a driving apparatus (5.2) thereof, at least three elastic band catapults (5.3) uniformly distributed on the rotating shaft mechanism, tackle locking apparatuses (5.4) mounted at start ends of the catapults, winches (5.5) for controlling the tackles to be reset and external power supplies thereof, and buffer apparatuses (5.6) mounted at tail ends of the catapults. Since the plurality of catapults perform alternate catapulting through rotation, the time for resetting the catapult tackles is saved, alternate continuous catapulting of the unmanned aerial vehicles is achieved, and the catapulting efficiency of the unmanned aerial vehicles is increased.

BRIEF DESCRIPTION OF THE DRAWINGS

In order to more clearly illustrate technical solutions in embodiments of the present invention, accompanying drawings required for use in the embodiments will be briefly introduced below. Obviously, the accompanying drawings in the following description are only some embodiments of the present invention, and those of ordinary skill in the art may obtain other accompanying drawings according to the accompanying drawings without any creative effort.

Figure 1:
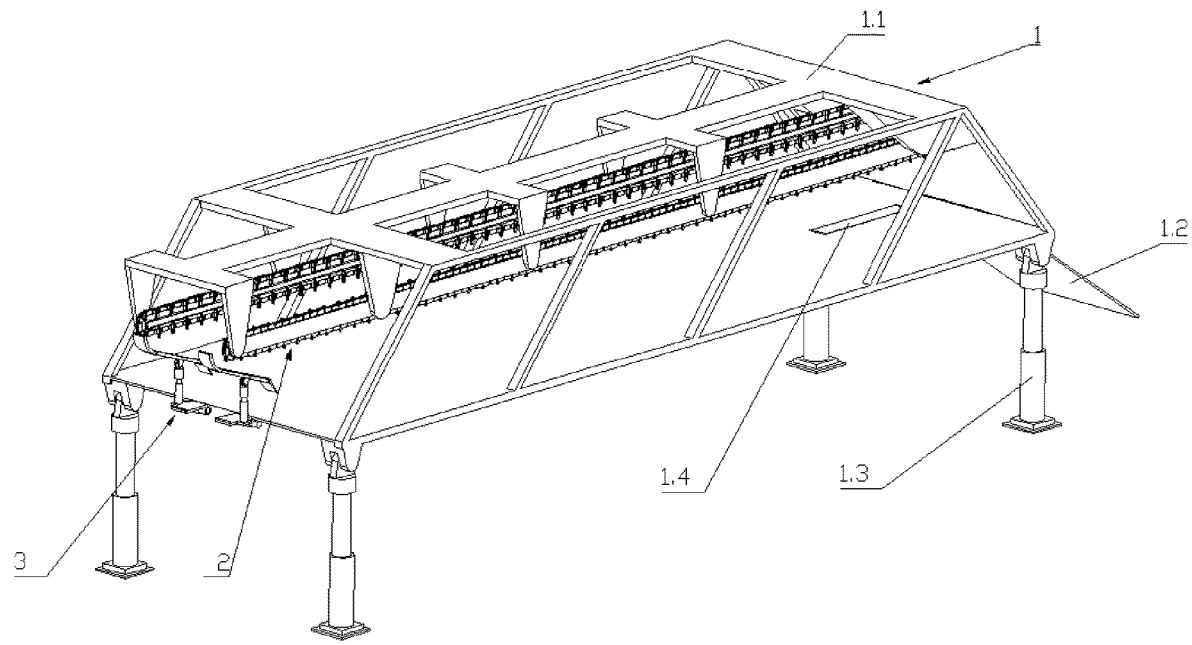
FIG. 1 is a schematic structural diagram of an automatic unmanned aerial vehicle loading and storage mechanism.

Numerals in the drawings respectively denote:

1: unmanned aerial vehicle storage apparatus; 1.1: structural framework; 1.2: entrance aisle panel; 1.3: supporting mechanism; 1.4: nose landing gear lifting mechanism; 1.5: main landing gear limiting mechanism;

2: unmanned aerial vehicle conveying apparatus; 2.1: conveying chain; 2.2: conveying chain driving apparatus; 2.3: clamping slot; 2.4: hook; 2.5: limiting wheel; 2.6: hook limiting track; 2.7: hook adjustment stop piece;

3: automatic unmanned aerial vehicle loading apparatus; 3.1: main landing gear supporting plate; 3.2: contact block; 3.3: wing supporting plate; 3.4: wing front limiting plate; 3.5: wing rear limiting plate; 3.6: height and angle adjustment mechanism;

4: tackle; 4.1: tackle body; 4.2: carrier structure; 4.3: rear limiting mechanism; 4.3.1: limiting baffle plate; 4.3.2: limiting slot; 4.3.3: reset spring; 4.4: front limiting mechanism; 4.4.1: limiting hook; 4.4.2: movable stop piece; 4.4.3: reset spring; 4.4.4: rotating shaft; 4.5: lock hole;

5: rotary tube-type multi-track unmanned aerial vehicle catapult; 5.1: rotating shaft mechanism; 5.2: rotating shaft driving apparatus; 5.3: catapult; 5.4: tackle locking apparatus; 5.4.1: contact plate; 5.4.2: lock catch; 5.4.3: reset spring; 5.5: winch; 5.6: buffer apparatus;

6: unmanned aerial vehicle; 6.1: unmanned aerial vehicle lifting hook; 6.2: unmanned aerial vehicle protruding feature; 6.3: unmanned aerial vehicle hook; and 6.4: unmanned aerial vehicle limiting barrier strip.

DETAILED DESCRIPTION OF THE INVENTION

In order to make those skilled in the art better understand technical solutions of the present invention, the present invention is further described in detail below with reference to the accompanying drawings and specific implementation manners. Implementation manners of the present invention are described in detail below, and examples of the implementation manners are illustrated in the accompanying drawings. The same or similar numerals indicate the same or similar elements or elements having the same or similar functions throughout. The implementation manners described below with reference to the accompanying drawings are exemplary, and are only intended to be illustrative of the present invention and not to be construed as limiting the present invention. Those skilled in the art can understand that, unless specifically stated otherwise, the singular forms "a", "an", "said" and "the" may also include plural forms. It should be further understood that the wording "include" used in the description of the present invention refers to the presence of the features, integers, steps, operations, elements and/or components, but does not exclude the presence or addition of one or more other features, integers, steps, operations, elements, components and/or their groups. It should be understood that when an element is referred to as being "connected" or "coupled" to another element, it can be directly connected or coupled to the other elements or intermediate elements may also exist. Furthermore, "connected" or "coupled" as used herein may include wireless connection or coupling. As used herein, the wording "and/or" includes any unit and all combinations of one or more of the associated listed items. Those skilled in the art can understand that, unless otherwise defined, all the terms (including technical terms and scientific terms) used herein have the same meanings as commonly understood by those of ordinary skill in the art to which the present invention belongs. It should further be understood that terms such as those defined in a general dictionary should be understood to have meanings consistent with the meanings in the context of the prior art, and unless specifically defined like this, they would not be idealized or explained by too formal meanings.

Figure 3:
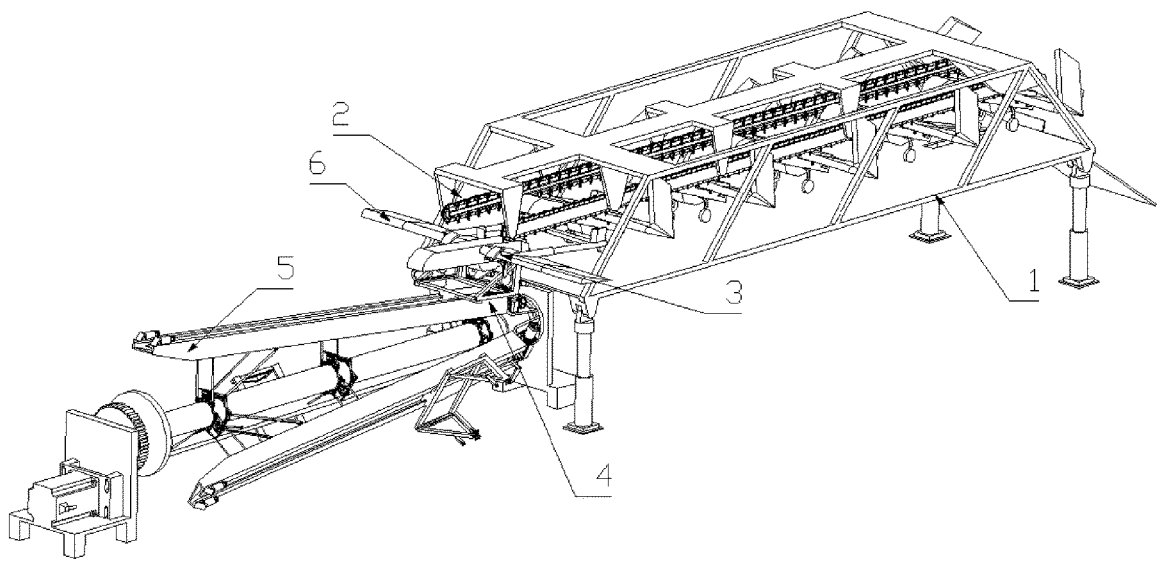
FIG. 3 is a schematic overall structural diagram of an apparatus for continuous catapulting of unmanned aerial vehicles.

Embodiments of the present invention provide an apparatus for continuous catapulting of unmanned aerial vehicles. As shown in FIG. 3, the apparatus consists of an unmanned aerial vehicle storage apparatus (1), an unmanned aerial vehicle conveying apparatus (2), an automatic unmanned aerial vehicle loading apparatus (3, details of which shown in FIG. 6), tackles (4) and a rotary tube-type multi-track unmanned aerial vehicle catapult (5).

The unmanned aerial vehicle storage apparatus (1) is configured to store the unmanned aerial vehicles (6). The unmanned aerial vehicle conveying apparatus (2) is inserted into the unmanned aerial vehicle storage apparatus (1). The unmanned aerial vehicle conveying apparatus (2) is symmetrically arranged along a central axis of the unmanned aerial vehicle storage apparatus (1).

The automatic unmanned aerial vehicle loading apparatus (3) is configured to transfer the unmanned aerial vehicles (6) from the unmanned aerial vehicle conveying apparatus (2) to the tackles (4).

The rotary tube-type multi-track unmanned aerial vehicle catapult (5) is provided with at least three catapults (5.3). Each catapult (5.3) is butted with one tackle (4) and is configured to provide the tackle (4) with a driving force during catapulting.

Specifically as shown in FIG. 1, the unmanned aerial vehicle storage apparatus (1) consists of a structural framework (1.1), an unmanned aerial vehicle entrance aisle panel (1.2), a supporting mechanism (1.3), an unmanned aerial vehicle nose landing gear lifting mechanism (1.4) and a main landing gear limiting mechanism (1.5).

The unmanned aerial vehicle (6) gets into the unmanned aerial vehicle storage apparatus (1) through the entrance aisle panel (1.2), and the supporting mechanism (1.3) adjusts a height and inclination angle of the unmanned aerial vehicle (6) for getting into the unmanned aerial vehicle storage apparatus (1).

The unmanned aerial vehicle (6) adjusts an angle during butting of the unmanned aerial vehicle (6) and the unmanned aerial vehicle conveying apparatus (2) through the main landing gear limiting mechanism (1.5) and the nose landing gear lifting mechanism (1.4).

Figure 4:
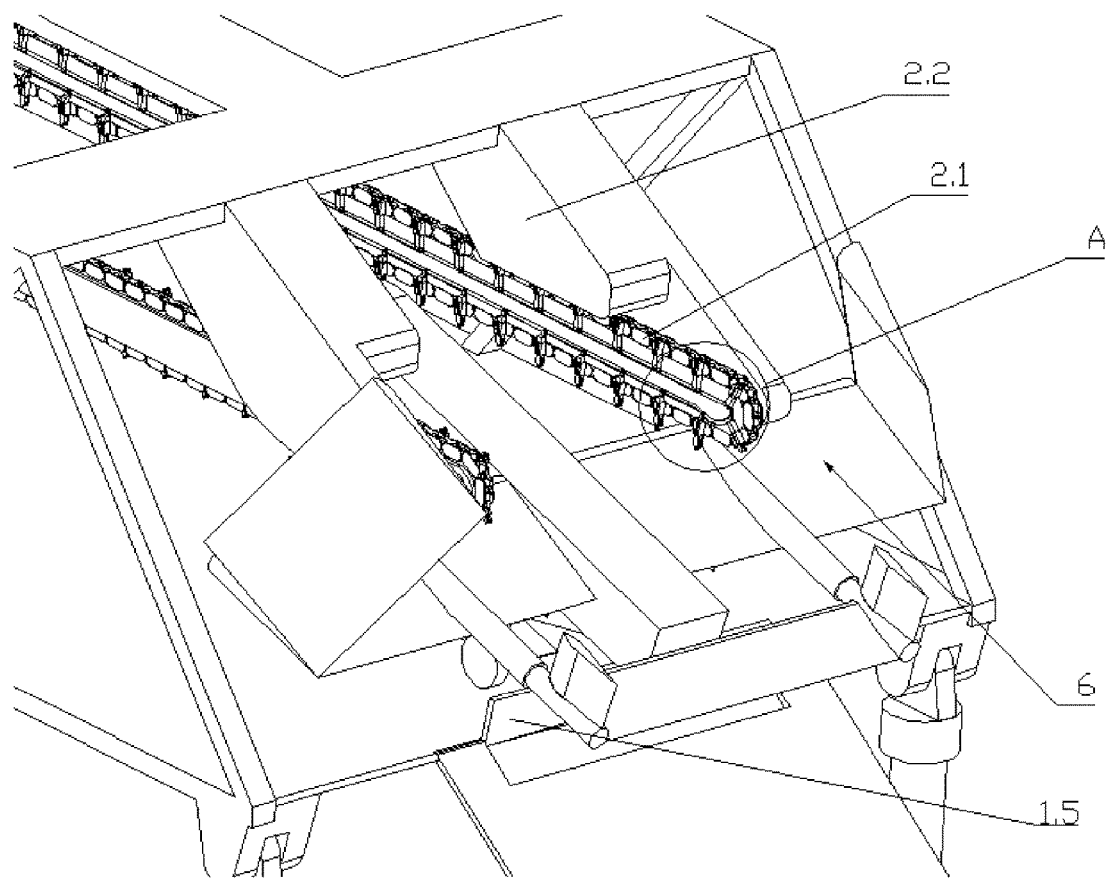
FIG. 4 is a schematic structural diagram of a start end of a conveying apparatus.
Figure 5:
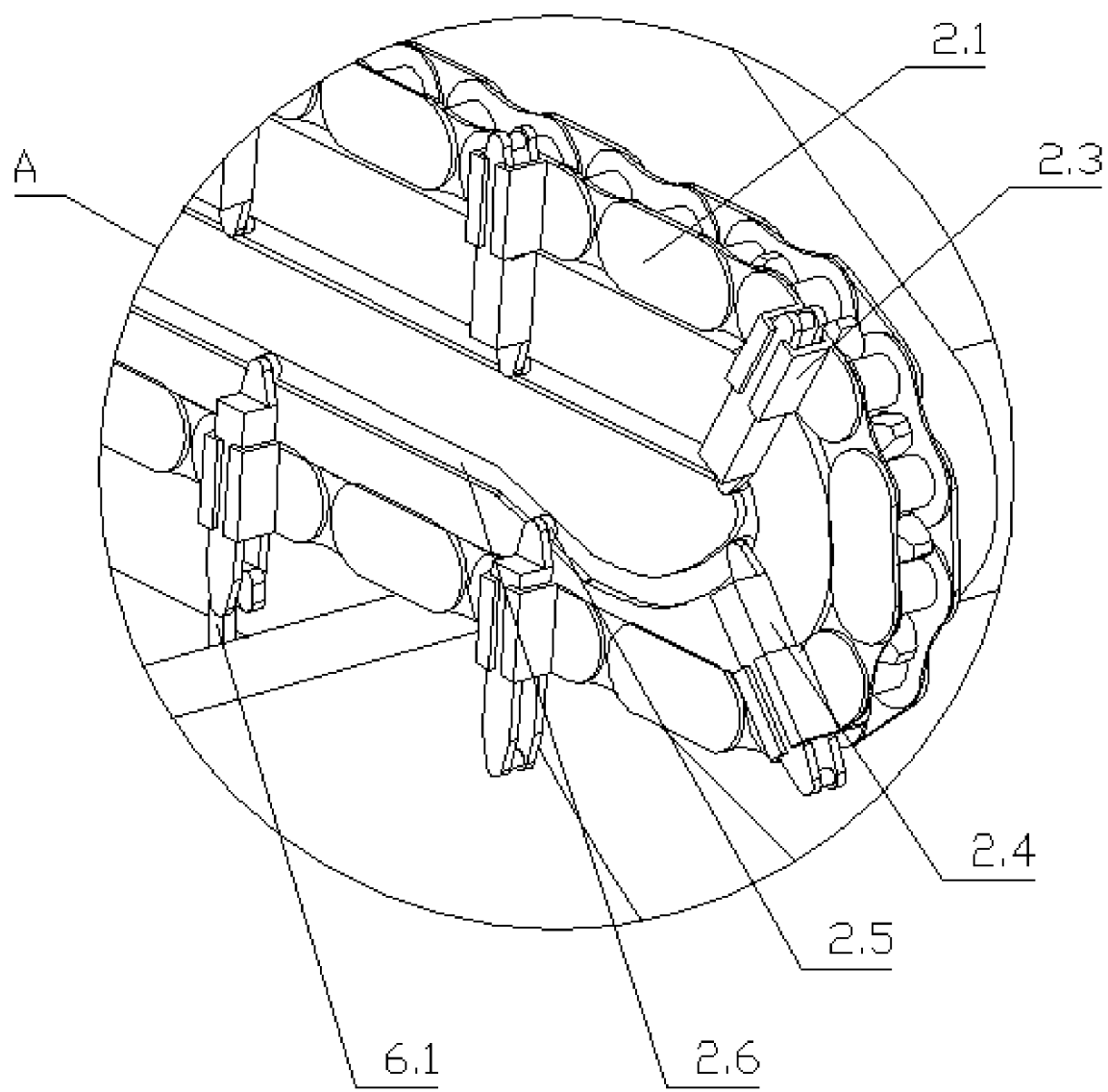
FIG. 5 is an enlarged diagram of A in FIG. 4.
Figure 7:
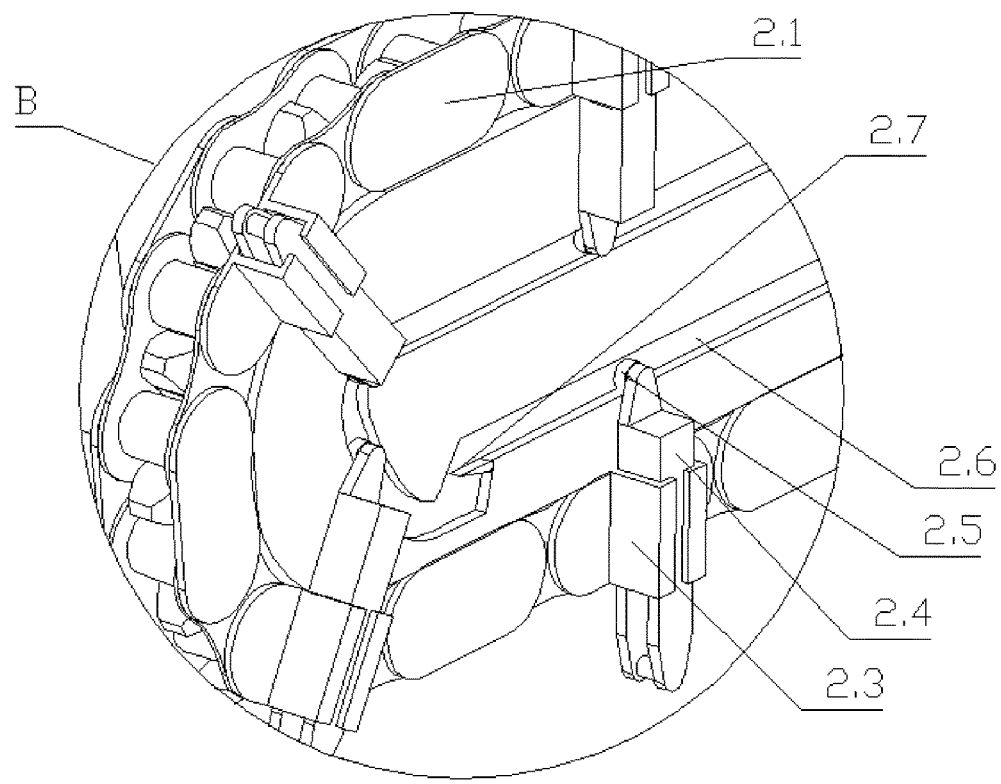
FIG. 7 is an enlarged diagram of B in FIG. 6.

Specifically as shown in FIG. 4, FIG. 5 and FIG. 7, the unmanned aerial vehicle conveying apparatus (2) consists of a conveying chain (2.1), a conveying chain driving apparatus (2.2), hooks (2.4), a hook limiting track (2.6) and a hook adjustment stop piece (2.7).

The conveying chain (2.1) and the driving apparatus (2.2) of the conveying chain (2.1) are mounted on the structural framework (1.1) of the unmanned aerial vehicle storage apparatus. The hooks (2.4) are mounted in clamping slots (2.3) of various single sections of the conveying chain (2.1). Limiting wheels (2.5) are mounted at top portions of the hooks (2.4). Limiting wheels (2.5) are placed in the hook limiting track (2.6). The hook limiting track (2.6) is parallel to the conveying chain (2.1). The hook adjustment stop piece (2.7) is mounted in the hook limiting track (2.6). The hook adjustment stop piece (2.7) is close to a tail end of the conveying chain (2.1).

The hook limiting track (2.6) is configured to adjust putting-down and retraction of the hooks (2.4) according to a distance between the track and the conveying chain (2.1). The hook adjustment stop piece (2.7) is configured to control a shape of the hook limiting track (2.6) at a tail end position of the conveying chain (2.1), so as to control separation of the hooks (2.4) from the unmanned aerial vehicle (6).

Figure 6:
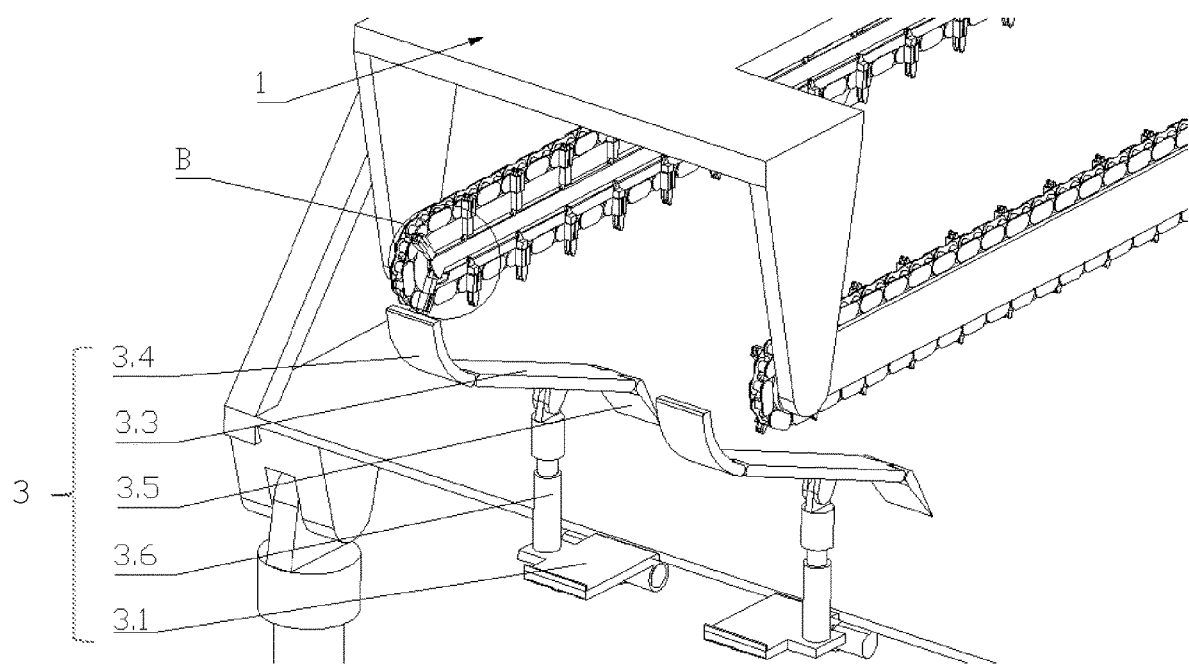
FIG. 6 is a schematic structural diagram of a tail end of the conveying apparatus.

Specifically as shown in FIG. 6 and FIG. 7, the automatic unmanned aerial vehicle loading apparatus (3) consists of main landing gear supporting plates (3.1), wing supporting plates (3.3), wing front limiting plates (3.4), wing rear limiting plates (3.5) and height and angle adjustment mechanisms (3.6).

The main landing gear supporting plates (3.1) are connected with the structural framework (1.1) of the unmanned aerial vehicle storage apparatus through a rotating mechanism. Contact blocks (3.2) for unlocking the tackles (4) are arranged below the main landing gear supporting plates (3.1). The wing supporting plates (3.3) are connected with the main landing gear supporting plates (3.1) through the height and angle adjustment mechanisms (3.6). The wing front limiting plates (3.4) are connected to front sides of the wing supporting plates (3.3). The wing rear limiting plates (3.5) are connected to rear sides of the wing supporting plates (3.3).

Figure 2:
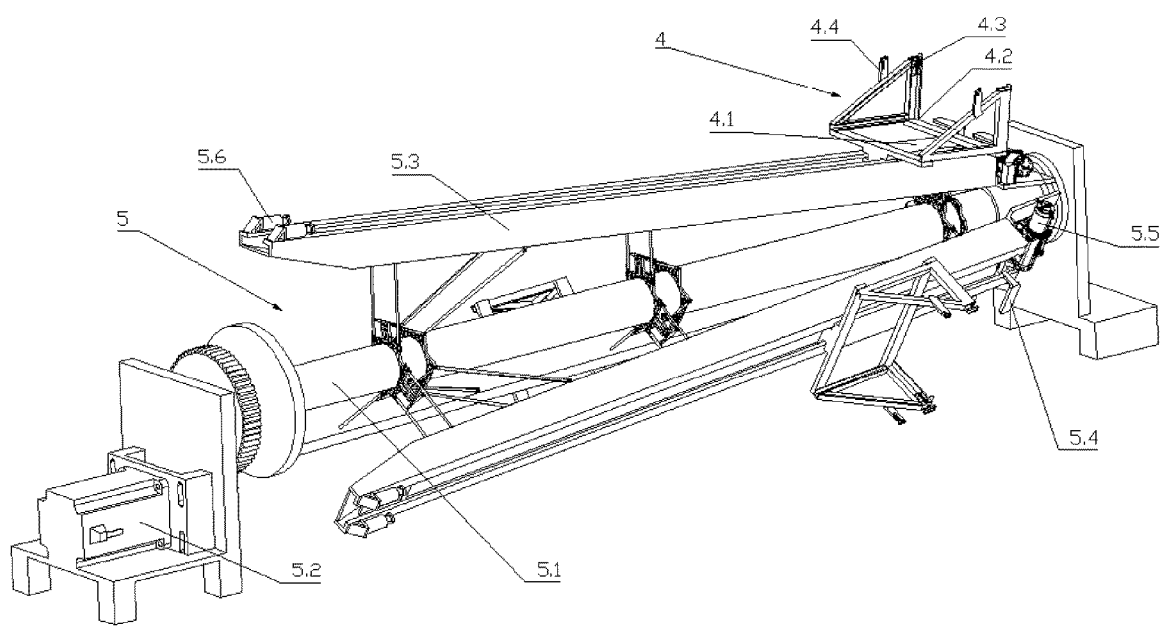
FIG. 2 is a schematic structural diagram of a rotary tube-type unmanned aerial vehicle continuous batch catapulting mechanism.
Figure 8:
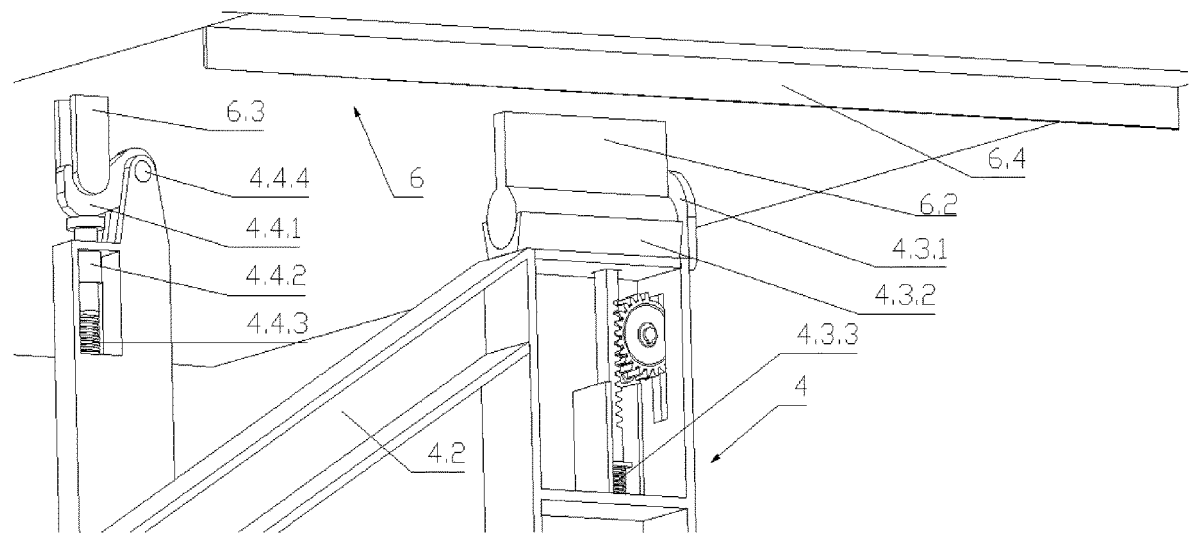
FIG. 8 is a schematic diagram of a locked state of an unmanned aerial vehicle locking mechanism.
Figure 9:
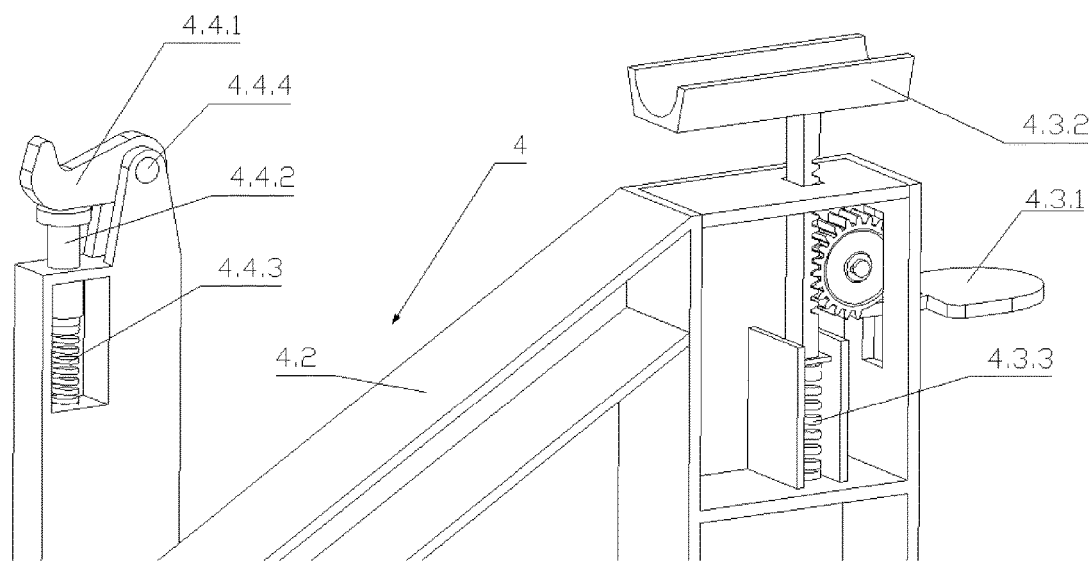
FIG. 9 is a schematic diagram of a reset state of the unmanned aerial vehicle locking mechanism.

Specifically, as shown in FIG. 2, FIG. 8 and FIG. 9, the tackle (4) consists of a tackle body (4.1), carrier structures (4.2), rear limiting mechanisms (4.3) and front limiting mechanisms (4.4).

The tackle body (4.1) is mounted on the catapult (5.3). A lock hole (4.5) butted with a locking apparatus (5.4) is formed in a rear portion of the tackle body (4.1), and the carrier structures (4.2) are mounted at an upper portion of the tackle body (4.1).

The rear limiting mechanisms (4.3) consist of limiting baffle plates (4.3.1) driven by gears and racks, limiting slots (4.3.2) and reset springs (4.3.3).

The rear limiting mechanisms (4.3) are mounted at the rear portions of the carrier structures (4.2).

The front limiting mechanisms (4.4) consist of limiting hooks (4.4.1) connected with the carrier structures through rotating shafts, movable stop pieces (4.4.2) for lifting the limiting hooks, and reset springs (4.4.3).

The front limiting mechanisms (4.4) are mounted at middle portions of the carrier structures (4.2).

Figure 10:
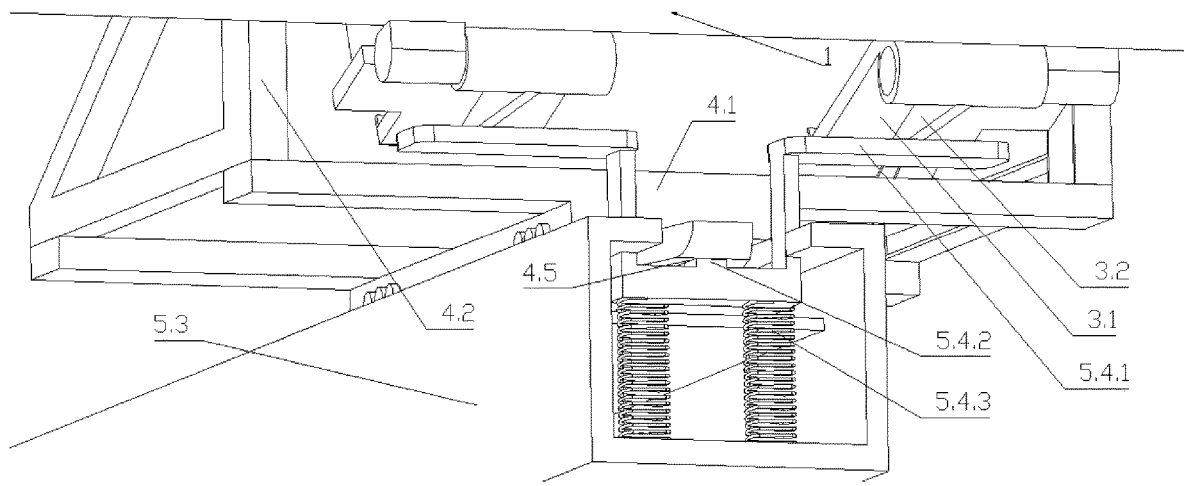
FIG. 10 is a schematic diagram of a tackle locking apparatus.
Figure 11:
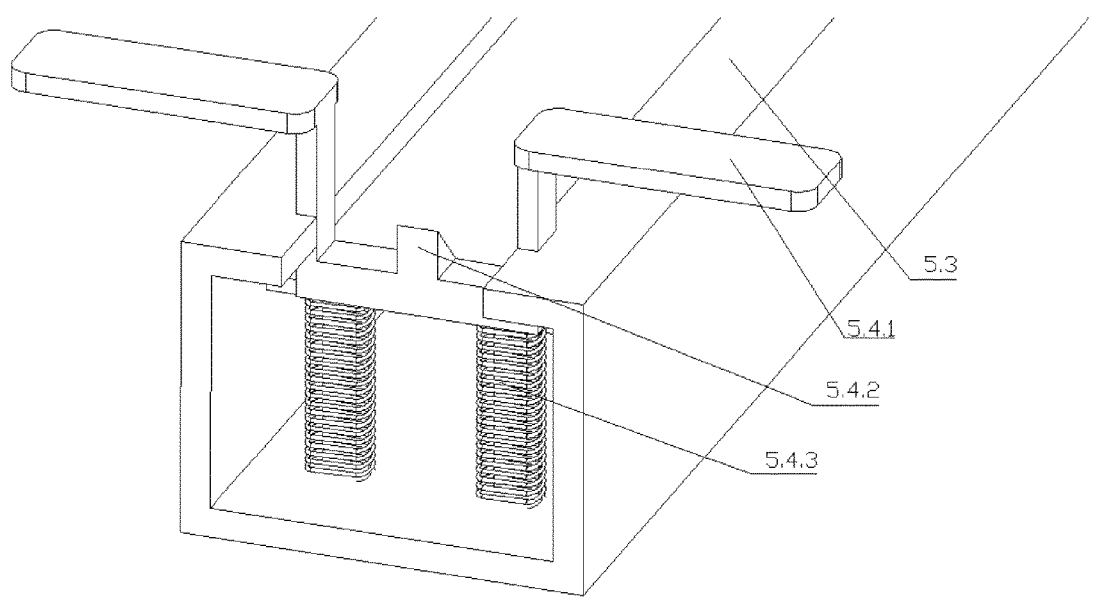
FIG. 11 is a schematic diagram of an unlocked state of the tackle locking apparatus.

Specifically as shown in FIG. 2, FIG. 10 and FIG. 11, the rotary tube-type multi-track unmanned aerial vehicle catapult (5) consists of a rotating shaft mechanism (5.1), a rotating shaft driving apparatus (5.2), the catapults (5.3), tackle locking apparatuses (5.4), reset winches (5.5) and tackle buffer apparatuses (5.6).

All the catapults (5.3) are uniformly distributed on the rotating shaft mechanism (5.1), and are driven to rotate by the driving apparatus (5.2). The tackle locking apparatuses (5.4) are mounted at start ends of the catapults (5.3). The tackle locking apparatuses (5.4) consist of locking structure main bodies provided with contact plates (5.4.1) and lock catches (5.4.2), and reset springs (5.4.3). The reset winches (5.5) are mounted at the start ends of the catapults (5.3), and are connected with the tackle bodies (4.1) through ropes.

The tackle buffer apparatuses (5.6) are mounted at tail ends of the catapults (5.3), and are configured to stop motion of the tackles (4).

Further, as shown in FIG. 8, the unmanned aerial vehicle (6) is a folding unmanned aerial vehicle.

Lifting hooks (6.1) butted with the hooks (2.4) of the conveying chain are mounted at the leading edges of wings of the unmanned aerial vehicle (6).

Protruding features (6.2) butted with rear limiting mechanisms (4.3), and hooks (6.3) butted with front limiting mechanisms (4.4) are mounted on lower aerofoils of the wings of the unmanned aerial vehicle (6).

Limiting barrier strips (6.4) matched with wing supporting plates (3.3) of the automatic unmanned aerial vehicle loading apparatus are also mounted on the lower aerofoils of the wings of the unmanned aerial vehicle (6).

The embodiments of the present invention provide a method for continuous catapulting of unmanned aerial vehicles. The method includes:

butting and separation of the unmanned aerial vehicle (6) and a unmanned aerial vehicle conveying apparatus (2) are realized through the cooperation of a conveying chain (2.1), hooks (2.4) and a hook limiting track (2.6).

An automatic unmanned aerial vehicle loading apparatus (3) conveys and butts the unmanned aerial vehicle (6) to carrier structures (4.2) of a tackle (4) through rotation a certain angle to realize loading of the unmanned aerial vehicle (6).

A catapult of a rotary tube-type multi-track unmanned aerial vehicle catapult (5) catapults the unmanned aerial vehicle (6), and then is automatically reset.

Specifically, a butting and separation process of the unmanned aerial vehicle (6) and the unmanned aerial vehicle conveying apparatus (2) includes:

The hook limiting track (2.6) controls the hooks (2.4) to extend out and be put down a certain distance near a start end of the conveying chain in a moving process along with the conveying chain according to a distance between the hook limiting track (2.6) and the conveying chain (2.1), and then to rise up and be retracted gradually so as to facilitate butting of the hooks (2.4) and lifting hooks (6.1) at leading edges of wings of the unmanned aerial vehicle to lift the wings of the unmanned aerial vehicle.

When the hooks (2.4) hooked with the unmanned aerial vehicle (6) move close to a hook adjustment stop piece (2.7) on the hook limiting track along with the conveying chain, the hook adjustment stop piece (2.7) rises up, and thus continuous motion of the hooks (2.4) enables their limiting wheels (2.5) to move onto the risen hook adjustment stop piece (2.7). By this time, the conveying chain stops moving, and the lower aerofoils of the wings of the unmanned aerial vehicle (6) are just in contact with wing supporting plates (3.3) of the automatic unmanned aerial vehicle loading apparatus, and are flush with the wing supporting plates (3.3) through limiting barrier strips (6.4). Later, wing front limiting plates (3.4) and rear limiting plates (3.5) rotatably rise up to clamp the wings, and the hook adjustment stop piece (2.7) is quickly put down after completion of clamping to enable the hooks (2.4) lifted thereon to drop down vertically and be separated from the unmanned aerial vehicle lifting hooks (6.1).

When the hooks (2.4) without the unmanned aerial vehicle (6) are close to the hook adjustment stop piece (2.7), the hook adjustment stop piece (2.7) does not rise up, so that the hooks directly move along with the conveying chain (2.1) and drop down vertically.

Specifically, a loading process of the unmanned aerial vehicle (6) includes:

Protruding features (6.2) on the lower aerofoils of the wings of the unmanned aerial vehicle (6) are in contact with limiting slots (4.3.2) of rear limiting mechanisms (4.3), and press down the limiting slot (4.3.2) and a reset spring (4.3.3) below the limiting slot (4.3.2) to drive racks to move downwards, so that gears matched with the racks start to rotate to drive limiting baffle plates (4.3.1) to rise up.

When the protruding features (6.2) press down the limiting slots (4.3.2) to be in contact with upper surfaces of the carrier structures (4.2), the limiting baffle plates (4.3.1) rise up to be in contact with rear surfaces of the protruding features (6.2).

Hooks (6.3) on the lower aerofoils of the wings of the unmanned aerial vehicle (6) are in contact with limiting hooks (4.4.1) of front limiting mechanisms (4.4), so that the limiting hooks (4.4.1) rotate downwards along rotating shafts (4.4.4), and press down movable stop pieces (4.4.2) and the reset springs (4.4.3) below the limiting hooks (4.4.1). When the movable stop pieces (4.4.2) are pressed down till elastic forces generated by the reset springs (4.4.3) are balanced with pressure on the limiting hooks (4.4.1), which is generated by gravity of the unmanned aerial vehicle (6), movable stop pieces (4.4.2) are not in contact with surfaces of the carrier structures (4.2), but by this time, the limiting hooks (4.4.1) and the movable stop pieces (4.4.2) cannot be continuously pressed down only by the gravity of the unmanned aerial vehicle.

After the unmanned aerial vehicle (6) completes butting with the tackle (4), the wing front limiting plates (3.4) and the rear limiting plates (3.5) of the automatic unmanned aerial vehicle loading apparatus (3) counter-rotate respectively to release the wings and be reset, and later, the automatic unmanned aerial vehicle loading apparatus (3) rotates downwards to be separated from the unmanned aerial vehicle (6).

Specifically, a process of catapulting, by the catapult of the rotary tube-type multi-track unmanned aerial vehicle catapult (5), the unmanned aerial vehicle (6), and then automatically resetting the catapult includes:

After the unmanned aerial vehicle (6) on the carrier structures (4.2) spreads, and an engine has a sufficient thrust, the automatic unmanned aerial vehicle loading apparatus (3) then rotates downwards till contact blocks (3.2) below the main landing gear supporting plates (3.1) are in contact with and press down contact plates (5.4.1) of a tackle locking apparatus (5.4), so that a lock catch (5.4.2) is separated from a lock hole (4.5) in a tackle body of the tackle (4), and the tackle (4) is released.

After the unmanned aerial vehicle (6) is completely separated from the carrier structures (4.2), the automatic loading apparatus (3) counter-rotates to be reset, and then a rotating shaft driving apparatus (5.2) is started to drive a rotating shaft mechanism (5.1) to rotate, so that a catapult (5.3) completing catapulting is deviated from a catapulting position at a top portion, and another reset catapult (5.3) is conveyed into the catapulting position.

The rear limiting mechanisms (4.3) and the front limiting mechanisms (4.4) on the tackle (4) are reset, and the tackle (4) is locked again. After the other reset catapult (5.3) is conveyed into the catapulting position, the conveying chain (2.1) is started again to convey the next unmanned aerial vehicle (6) onto the automatic unmanned aerial vehicle loading apparatus (3).

Traditional small and medium-sized unmanned aerial vehicle catapulting usually adopts elastic band catapulting, pneumatic-hydraulic catapulting and rocket-assisted catapulting. The rocket-assisted catapulting will generate a lot of light and heat, which is not conducive to concealment, and the pneumatic-hydraulic catapulting requires an external set of pneumatic-hydraulic power system, which reduces portability of a system to a certain extent. In addition, recharging time of an energy storage apparatus is too long, and it is difficult to achieve the continuous catapulting of the unmanned aerial vehicles. Therefore, the prior art has the following problems:

1. The rocket-assisted catapulting would generate a lot of light and heat, which is not conducive to concealment.

2. The pneumatic-hydraulic catapulting requires an external set of pneumatic-hydraulic power system, which reduces portability of a system to a certain extent.

3. Recharging time of an energy storage apparatus is too long, and it is difficult to achieve the continuous catapulting of the unmanned aerial vehicles.

4. In an existing unmanned aerial vehicle catapulting apparatus, a connection and locking process of the unmanned aerial vehicles and the catapult tackles is complex in operation. At least two persons are needed to complete butting and locking of the unmanned aerial vehicles and the tackles. The process is tedious, takes a relatively long time, occupies supernumerary and prolongs a catapulting period.

The technical solutions of the present embodiment include the unmanned aerial vehicle storage apparatus, the unmanned aerial vehicle conveying apparatus, the automatic unmanned aerial vehicle loading apparatus, the tackle and unmanned aerial vehicle locking mechanism and the rotary tube-type multi-track unmanned aerial vehicle catapult. A working principle of the continuous catapulting of the unmanned aerial vehicles is specifically described in combination with the apparatus for the continuous catapulting of the unmanned aerial vehicles.

After the folded unmanned aerial vehicle 6 gets into the unmanned aerial vehicle storage apparatus 1 through the entrance aisle panel 1.2, the main landing gear limiting mechanism 1.5 rises up to limit the unmanned aerial vehicle to move backwards, and the nose landing gear lifting mechanism 1.4 rises up to lift the unmanned aerial vehicle to enable the unmanned aerial vehicle to rise up an angle by taking a main landing gear as a shaft. Meanwhile, the conveying chain driving apparatus 2.2 is started to drive the conveying chain 2.1 and the hooks 2.4 to move. The hooks 2.4 are mounted in the clamping slots 2.3 of the various single sections of the conveying chain, and the limiting wheels 2.5 on the hooks are arranged in the hook limiting track 2.6. The hooks 2.4 are controlled to rise, drop, extend and retract according to distance changes between the hook limiting track 2.6 and the conveying chain 2.1. If a distance is relatively long, the hooks 2.4 rise up to be retracted, or the hooks 2.4 are put down. The hooks 2.4 at the start end of the conveying chain are put down and extend out a certain distance at first to hook the lifting hooks 6.1 at the leading edges of the wings of the unmanned aerial vehicle that has risen up a certain angle. After the butting is completed, the hooks 2.4 move forwards along with the conveying chain 2.1, and rise up to be retracted along the hook limiting track 2.6 at the same time, so that the unmanned aerial vehicle is lifted by the lifting hooks 6.1 on the wings on both sides. Meanwhile, the nose landing gear lifting mechanism 1.4 and the main landing gear limiting mechanism 1.5 drop down to be retracted, so that the unmanned aerial vehicle is conveyed forwards by the conveying chain through the lifting hooks 6.1 on the wings on both sides. When one unmanned aerial vehicle is conveyed forwards a certain distance, the next unmanned aerial vehicle gets into the unmanned aerial vehicle storage apparatus 1 again through the entrance aisle panel 1.2. Later, a butting step with the conveying chain 2.1 is executed again, and the next unmanned aerial vehicle is conveyed forwards till the whole unmanned aerial vehicle storage apparatus 1 is full of a certain number of unmanned aerial vehicles.

When the unmanned aerial vehicle 6 is conveyed to a tail end of the unmanned aerial vehicle storage apparatus 1, and the limiting wheels 2.5 of the hooks reach a position above the hook adjustment stop piece 2.7, the conveying chain 2.1 stops moving. By this time, the main landing gear of the unmanned aerial vehicle is stopped on the main landing gear supporting plates 3.1 of the automatic unmanned aerial vehicle loading apparatus 3, and the lower aerofoils of the wings are in contact with the wing supporting plates 3.3 and are flush with the wing supporting plates 3.3 through the limiting barrier strips 6.4. By this time, the wing rear limiting plates 3.5 rise up to limit the unmanned aerial vehicle 6 to slide backwards, and the wing front limiting plates 3.4 rotate inwards a certain angle to lock the leading edges of the wings. After the automatic unmanned aerial vehicle loading apparatus 3 completes clamping of the wings, the hook adjustment stop piece 2.7 is put down to enable the lifted hooks 2.4 to drop down vertically and be separated from the lifting hooks 6.1 at the leading edges of the wings of the unmanned aerial vehicle 6.

The unmanned aerial vehicle 6 separated from the conveying chain 2.1 rotates downwards an angle under the driving of the automatic unmanned aerial vehicle loading apparatus 3, so as to be butted with the unmanned aerial vehicle locking mechanisms of the carrier structures 4.2 of the tackle to realize automatic loading of the unmanned aerial vehicle. In this process, the protruding features 6.2 on the lower aerofoils of the wings are in contact with the limiting slots of the rear limiting mechanisms 4.3 of the carriers, and press down the limiting slots and the racks and the reset springs 4.3.3 below the limiting slots. Since the racks move downwards, the gears matched therewith rotate with the racks to enable the limiting baffle plates to rise up. When the protruding features 6.2 below the wings press down the limiting slots to be in contact with the upper surfaces of the carrier structures 4.2, the limiting baffle plates just rise up to be in contact with the rear surfaces of the protruding features 6.3 to complete the butting of the protruding features 6.2 with the rear limiting mechanisms 4.3, which limits the unmanned aerial vehicle 6 to slide backwards. Meanwhile, the hooks 6.3 on the lower aerofoils of the wings are in contact with the limiting hooks 4.4.1 of the front limiting mechanisms 4.4 of the carrier structures 4.4, so that the limiting hooks rotate downwards along the rotating shafts 4.4.4, and press down the movable stop pieces 4.4.2 and the reset springs 4.4.3 below the limiting hooks. When the movable stop pieces 4.4.2 are pressed down till the elastic forces generated by the reset springs 4.4.3 are just balanced with the pressure on the limiting hooks 4.4.1, which is generated by the gravity of the unmanned aerial vehicle 6, the movable stop pieces 4.4.2 are not in contact with the surfaces of the carrier structures 4.2, but the limiting hooks 4.4.1 and the movable stop pieces 4.4.2 cannot be continuously pressed down only by the gravity of the unmanned aerial vehicle 6, thereby completing cooperation between the hooks 6.3 and the front limiting mechanisms 4.4 and limiting the unmanned aerial vehicle to move forwards. After cooperation with the unmanned aerial vehicle locking mechanisms is completed, weight of the unmanned aerial vehicle 6 is completely carried by the carrier structures 4.2. By this time, the wing front limiting plates 3.4 and the rear limiting plates 3.5 of the automatic loading apparatus 3 counter-rotate respectively to spread and be reset, and later, the automatic unmanned aerial vehicle loading apparatus 3 rotates downwards an angle to be completely separated from the unmanned aerial vehicle 6.

After the unmanned aerial vehicle 6 completes the butting with the tackle 4, it may spread, and the engine is started to prepare for catapulting. After the unmanned aerial vehicle 6 completely spreads, and the engine has the sufficient thrust, the automatic unmanned aerial vehicle loading apparatus 3 rotates downwards an angle again to enable its unlocking contact blocks 3.2 to be in contact with and press down the contact plates 5.4.1 of the tackle locking apparatus 5.4, so that the lock catch 5.4.2 leaves the lock hole 4.5 in the tackle body to unlock and release the tackle 4, and the tackle 4 is pulled by the rope to move forwards in an accelerated manner. When moving to the tail end of the catapult and colliding with the buffer apparatus 5.6, the tackle 4 is decelerated rapidly and stops. By this time, the unmanned aerial vehicle uses inertia generated by an existing relatively high speed to thrust aside the limiting hooks 4.4.1 of the front limiting mechanisms 4.4 of the carriers to release the unmanned aerial vehicle.

After the unmanned aerial vehicle leaves the carriers, the reset springs 4.3.3 of the rear limiting mechanisms 4.3 rebound to drive the limiting slots 4.3.2 connected to the reset springs to be reset and rise up and to drive the limiting plates 4.3.1 to counter-rotate and be put down. The reset springs 4.4.3 of the front limiting mechanisms 4.4 also rebound to drive the movable stop pieces 4.4.2 and the limiting hooks 4.4.1 to rise up again. By this time, the rotating shaft driving apparatus 5.2 of the catapult is started to drive the whole rotating shaft to rotate at a certain speed, so that the catapult 5.3 completing a catapulting step is deviated from the catapulting position at the top portion, and another catapult that has prepared for catapulting gets into the catapulting position to prepare to start the catapulting of the next unmanned aerial vehicle. After the catapult 5.3 rotates to be deviated from the catapulting position, the winch 5.5 at the start end of the track is started to pull the tackle 4 to return to the start end. When the tackle is in contact with the lock catch 5.4.2 of the locking apparatus 5.4 and then continues to move back to press down the lock catch 5.4.2 and the reset spring 5.4.3 till the lock hole 4.5 reaches a position above the lock catch 5.4.2, so that the lock catch 5.4.2 gets into the lock hole 4.5 under pushing of the reset spring 5.4.3, thus locking the tackle 4 and completing preparation for re-catapulting. After the prepared catapult 5.3 rotates to return to the catapulting position again, the conveying chain 2.1 is started again to convey the next unmanned aerial vehicle onto the automatic unmanned aerial vehicle loading apparatus 3, and the steps of automatic loading, spreading, starting of the engine and catapulting are re-executed to achieve the continuous batch catapulting of the unmanned aerial vehicles.

Therefore, this solution has at least the following advantages:

Firstly, the automatic unmanned aerial vehicle loading apparatus includes the main landing gear supporting plates connected with the unmanned aerial vehicle storage apparatus and the unlocking contact blocks below the main landing gear supporting plates, the wing supporting plates and the wing front and rear limiting plates in front of and behind the wing supporting plates, and height and angle adjustment mechanisms connected with the main landing gear supporting plates and the wing supporting plates. The tackles are mounted on the catapult tracks. The upper portion of the tackle body includes the carrier structure and the unmanned aerial vehicle locking mechanism on the carrier. The rear portion of the carrier includes the rear limiting mechanism, and the rear limiting mechanism consists of the limiting baffle plate driven through the gear and the rack, the limiting slot and the reset spring. The middle portion of the carrier includes the front limiting mechanism, and the front limiting mechanism consists of the limiting hook connected with the carrier structure through the rotating shaft, the movable stop piece for lifting the limiting hook, and the reset spring. The automatic unmanned aerial vehicle loading apparatus may clamp the unmanned aerial vehicle, then conveys the unmanned aerial vehicle onto the carrier structures of the tackle through rotation, and releases and is separated from the unmanned aerial vehicle, so that the unmanned aerial vehicle is automatically butted with the carriers of the tackle and is locked and mounted, labor and time cost required for manual implementation of this process is reduced, and the catapulting efficiency of the unmanned aerial vehicle is favorably increased.

Secondly, the rotary tube-type multi-track unmanned aerial vehicle catapult includes the rotating shaft mechanism for controlling the catapult to rotate and the driving apparatus thereof, the at least three elastic band catapults uniformly distributed on the rotating shaft mechanism, the tackle locking apparatuses mounted at the start ends of the catapults, the winches for controlling the tackles to be reset and the external power supplies thereof, and the buffer apparatuses at the tail ends of the catapults. The plurality of catapults of the rotary tube-type multi-track unmanned aerial vehicle catapult may alternately catapult the unmanned aerial vehicles through rotation, thereby saving the time for resetting the catapult tackles and achieving the alternate continuous catapulting of the unmanned aerial vehicles.

Thirdly, the unmanned aerial vehicle storage apparatus is configured to store the unmanned aerial vehicles. The unmanned aerial vehicle conveying apparatus is inserted into the unmanned aerial vehicle storage apparatus. The unmanned aerial vehicle conveying apparatus is symmetrically arranged along the central axis of the unmanned aerial vehicle storage apparatus. The unmanned aerial vehicle storage apparatus includes the structural framework, the entrance aisle panel for enabling the unmanned aerial vehicles to get into, the supporting mechanism for adjusting the height and inclination angle of the apparatus, the main landing gear limiting mechanism for adjusting the angles of the unmanned aerial vehicles to enable the unmanned aerial vehicles to be butted with the conveying apparatus, and the nose landing gear lifting mechanism. The unmanned aerial vehicle conveying apparatus includes the conveying chain mounted on the structural framework of the unmanned aerial vehicle storage apparatus and the driving apparatus at the start end, hooks mounted in the clamping slots of the various single sections of the conveying chain and provided with limiting wheels at the top portions, the hook limiting track parallel to the conveying chain and capable of adjusting the heights of the hooks, and the hook adjustment stop piece located at the tail end position of the conveying chain on this track and configured to control the hooks to be separated from the unmanned aerial vehicles. Through the cooperation between the unmanned aerial vehicle storage apparatus and the unmanned aerial vehicle conveying apparatus, the butting and separation of the unmanned aerial vehicles and the unmanned aerial vehicle conveying apparatus, and conveying of the unmanned aerial vehicle in the unmanned aerial vehicle storage apparatus may be automatically completed, thereby realizing staggered stacking of the unmanned aerial vehicles in the unmanned aerial vehicle storage apparatus. Therefore, more unmanned aerial vehicles may be stored in a limited space, which increases a space utilization rate. After all the unmanned aerial vehicles in one unmanned aerial vehicle storage apparatus are catapulted, another unmanned aerial vehicle storage apparatus may be quickly replaced, so that the unmanned aerial vehicle storage apparatus may be made into a modular storage apparatus which is convenient for transportation and quick replacement.

Fourthly, the structural features on the unmanned aerial vehicle include the lifting hooks mounted at the leading edges of the wings of the unmanned aerial vehicle and butted with the hooks of the conveying chain, the protruding features mounted on the lower aerofoils of the wings and butted with the rear limiting mechanisms of the carriers of the tackle, hooks butted with the front limiting mechanisms of the carriers of the tackle, and limiting barrier strips matched with the wing supporting plates of the automatic unmanned aerial vehicle loading apparatus. In this way, the existing folding unmanned aerial may be applied to the apparatus of the present embodiment after it is simply transformed.

It can be known from the above advantages from one to four that according to the solution provided by the present embodiment, the traditional elastic band catapults cooperate with one set of rotary tube mechanism and one set of automatic unmanned aerial vehicle storage and loading mechanism to achieve modularization of storage of the unmanned aerial vehicles, automatic loading of the unmanned aerial vehicles and multi-track alternate catapulting, so as to increase the catapulting efficiency of the unmanned aerial vehicles.

The various embodiments in this description are described in a progressive manner, and mutual reference may be made to the same or similar parts between the various embodiments. Each embodiment focuses on differences from other embodiments. In particular, as for the apparatus embodiment, since it is basically similar to the method embodiment, it is described relatively simple, and for the relevant parts, reference may be made to part of the illustration of the method embodiment. The above is only the specific implementation manners of the present invention, but the scope of protection of the present invention is not limited thereto. Changes or replacements of which can be easily thought by any person skilled in the art within the technical scope disclosed by the present invention should be covered by the scope of protection of the present invention. Therefore, the scope of protection of the present invention should be determined by the scope of protection of the claims.

What is claimed is:

1. An apparatus for continuous catapulting of unmanned aerial vehicles, wherein the apparatus comprises an unmanned aerial vehicle storage apparatus, an unmanned aerial vehicle conveying apparatus, an automatic unmanned aerial vehicle loading apparatus, tackles and a rotary tube-type multi-track unmanned aerial vehicle catapult;

the unmanned aerial vehicle storage apparatus is configured to store the unmanned aerial vehicles; the unmanned aerial vehicle conveying apparatus is inserted into the unmanned aerial vehicle storage apparatus; the unmanned aerial vehicle conveying apparatus is symmetrically arranged along a central axis of the unmanned aerial vehicle storage apparatus;

the automatic unmanned aerial vehicle loading apparatus is configured to transfer the unmanned aerial vehicles from the unmanned aerial vehicle conveying apparatus to the tackles;

the rotary tube-type multi-track unmanned aerial vehicle catapult is provided with at least three catapults, and each one of the at least three catapults is butted with one of the tackles and is configured to provide said one of the tackles with a driving force during catapulting.

2. The apparatus according to claim 1, wherein the unmanned aerial vehicle storage apparatus comprises a structural framework, an unmanned aerial vehicle entrance aisle panel, a supporting mechanism, an unmanned aerial vehicle nose landing gear lifting mechanism and a main landing gear limiting mechanism;

wherein the entrance aisle panel is configured to allow an unmanned aerial vehicle to enter the unmanned aerial vehicle storage apparatus through the entrance aisle panel, and the supporting mechanism is configured to adjust a height and inclination angle of the unmanned aerial vehicle for entering the unmanned aerial vehicle storage apparatus;

wherein the main landing gear limiting mechanism and the unmanned aerial vehicle noise landing gear lifting mechanism are configured to allow the unmanned aerial vehicle to adjust an angle during butting of the unmanned aerial vehicle and the unmanned aerial vehicle conveying apparatus.

3. The apparatus according to claim 2, wherein the unmanned aerial vehicle conveying apparatus comprises a conveying chain, a conveying chain driving apparatus, conveying hooks, a hook limiting track and a hook adjustment stop piece;

the conveying chain and the conveying chain driving apparatus are mounted on the structural framework of the unmanned aerial vehicle storage apparatus; the conveying hooks are mounted in clamping slots of various single sections of the conveying chain; hook limiting wheels are mounted at top portions of the conveying hooks; the hook limiting wheels are placed in the hook limiting track; the hook limiting track is parallel to the conveying chain; the hook adjustment stop piece is mounted in the hook limiting track; the hook adjustment stop piece is close to a tail end of the conveying chain;

the hook limiting track is configured to adjust putting-down and retraction of the conveying hooks according to a distance between the hook limiting track and the conveying chain; the hook adjustment stop piece is configured to control a shape of the hook limiting track at a tail end position of the conveying chain, so as to control separation of the conveying hooks from the unmanned aerial vehicle.

4. The apparatus according to claim 2, wherein the automatic unmanned aerial vehicle loading apparatus comprises main landing gear supporting plates, wing supporting plates, wing front limiting plates, wing rear limiting plates and height and angle adjustment mechanisms;

the main landing gear supporting plates are connected with the structural framework of the unmanned aerial vehicle storage apparatus through a rotating mechanism; contact blocks for unlocking the tackles are arranged below the main landing gear supporting plates; the wing supporting plates are connected with the main landing gear supporting plates through the height and angle adjustment mechanisms; the wing front limiting plates are connected to front sides of the wing supporting plates; the wing rear limiting plates are connected to rear sides of the wing supporting plates.

5. The apparatus according to claim 1, wherein the tackles comprise tackle bodies, carrier structures, rear limiting mechanisms and front limiting mechanisms;

each one of tackle bodies is mounted on one of the at least three catapults; a lock hole butted with a locking apparatus is formed in a rear portion of each one of tackle bodies; the carrier structures are mounted at an upper portion of each one of tackle bodies;

the rear limiting mechanisms comprise limiting baffle plates driven by gears and racks, limiting slots and rear limiting mechanism reset springs;

the rear limiting mechanisms are mounted at rear portions of the carrier structures;

the front limiting mechanisms comprise limiting hooks connected with the carrier structures through rotating shafts, movable stop pieces for lifting the limiting hooks, and front limiting mechanism reset springs;

the front limiting mechanisms are mounted at middle portions of the carrier structures.

6. The apparatus according to claim 1, wherein the rotary tube-type multi-track unmanned aerial vehicle catapult comprises a rotating shaft mechanism, a rotating shaft driving apparatus, the at least three catapults, tackle locking apparatuses, reset winches and tackle buffer apparatuses;

all the at least three catapults are uniformly distributed on the rotating shaft mechanism, and are driven to rotate by the driving apparatus; the tackle locking apparatuses are mounted at start ends of the at least three catapults; the tackle locking apparatuses comprise locking structure main bodies provided with contact plates and lock catches, and reset springs; the reset winches are mounted at the start ends of the at least three catapults, and are connected with the tackle bodies through ropes; and the tackle buffer apparatuses are mounted at tail ends of the at least three catapults, and are configured to stop motion of the tackles.

7. The apparatus according to claim 1, wherein the unmanned aerial vehicle is a folding unmanned aerial vehicle;

unmanned aerial vehicle lifting hooks butted with the conveying hooks of the conveying chain are mounted at leading edges of wings of the unmanned aerial vehicle;

protruding features butted with rear limiting mechanisms, and unmanned aerial vehicle hooks butted with front limiting mechanisms are mounted on lower aerofoils of the wings of the unmanned aerial vehicle;

limiting barrier strips matched with wing supporting plates of the automatic unmanned aerial vehicle loading apparatus are also mounted on the lower aerofoils of the wings of the unmanned aerial vehicle.

8. A method for continuous catapulting of unmanned aerial vehicles, comprising:

realizing butting and separation of an unmanned aerial vehicle and an unmanned aerial vehicle conveying apparatus through cooperation of a conveying chain, conveying hooks and a hook limiting track;

conveying and butting, by an automatic unmanned aerial vehicle loading apparatus, the unmanned aerial vehicle to carrier structures of a tackle through rotation of a certain angle to realize loading of the unmanned aerial vehicle; and catapulting, by a catapult of a rotary tube-type multi-track unmanned aerial vehicle catapult, the unmanned aerial vehicle, and automatically resetting the catapult.

9. The method according to claim 8, wherein a butting and separation process of the unmanned aerial vehicle and the unmanned aerial vehicle conveying apparatus comprises:

the hook limiting track controls the conveying hooks to extend out and be put down a certain distance near a start end of the conveying chain in a moving process along with the conveying chain according to a distance between the hook limiting track and the conveying chain, and then to rise up and be retracted gradually so as to facilitate butting of the conveying hooks and unmanned aerial vehicle lifting hooks at leading edges of wings of the unmanned aerial vehicle and lift the wings of the unmanned aerial vehicle;

when the conveying hooks hooked with the unmanned aerial vehicle move close to a stop piece on the hook limiting track along with the conveying chain, the hook adjustment stop piece rises up, and continuous motion of the conveying hook enabled hook limiting wheels to move onto the hook adjustment stop piece; by this time, the conveying chain stops moving, and the lower aerofoils of the wings of the unmanned aerial vehicle are just in contact with wing supporting plates of the automatic unmanned aerial vehicle loading apparatus, and are flush with the wing supporting plates through limiting barrier strips; later, wing front limiting plates and rear limiting plates rotatably rise up to clamp the wings, and the hook adjustment stop piece is quickly put down after completion of clamping to enable the conveying hooks lifted thereon to drop down vertically and be separated from the unmanned aerial vehicle lifting hooks;

when the conveying hooks without the unmanned aerial vehicle are close to the hook adjustment stop piece, the hook adjustment stop piece does not rise up, so that the conveying hooks directly move along with the conveying chain and drop down vertically.

10. The method according to claim 8, wherein a loading process of the unmanned aerial vehicle comprises:

protruding features on lower aerofoils of wings of the unmanned aerial vehicle are in contact with limiting slots of rear limiting mechanisms, and press down the limiting slot and rear limiting mechanism reset springs below the limiting slot to drive racks to move downwards, so that gears matched with the racks start to rotate to drive limiting baffle plates to rise up;

when the protruding features press down the limiting slots to be in contact with upper surfaces of the carrier structures, the limiting baffle plates rise up to be in contact with rear surfaces of the protruding features;

unmanned aerial vehicle hooks on the lower aerofoils of the wings of the unmanned aerial vehicle are in contact with limiting hooks of front limiting mechanisms, so that the limiting hooks rotate downwards along rotating shafts, and press down movable stop pieces and the front limiting mechanism reset springs below the limiting hooks;

after the unmanned aerial vehicle completes butting with the tackle, wing front limiting plates and rear limiting plates of the automatic unmanned aerial vehicle loading apparatus counter-rotate respectively to release the wings and be reset, and later, the automatic unmanned aerial vehicle loading apparatus rotates downwards to be separated from the unmanned aerial vehicle;

a process of catapulting, by the catapult of the rotary tube-type multi-track unmanned aerial vehicle catapult, the unmanned aerial vehicle, and then automatically resetting the catapult includes:

after the unmanned aerial vehicle on the carrier structures spreads, and an engine has a sufficient thrust, the automatic unmanned aerial vehicle loading apparatus rotates downwards till contact blocks below main landing gear supporting plates are in contact with and press down contact plates of a tackle locking apparatus, so that a lock catch is separated from a lock hole in a one of the tackle bodies of the tackle, and the tackle is released;

after the unmanned aerial vehicle is completely separated from the carrier structures, the automatic unmanned aerial vehicle loading apparatus counter-rotates to be reset, and then a rotating shaft driving apparatus is started to drive a rotating shaft mechanism to rotate, so that a catapult completing catapulting is deviated from a catapulting position at a top portion, and another reset catapult is conveyed into the catapulting position;

the rear limiting mechanisms and the front limiting mechanisms on the tackle are reset, and the tackle is locked again; after the other reset catapult is conveyed into the catapulting position, the conveying chain is started again to convey a next unmanned aerial vehicle onto the automatic unmanned aerial vehicle loading apparatus.

* * * * *